United States Patent [19]

Mugglestone

[11] Patent Number: 5,102,235
[45] Date of Patent: Apr. 7, 1992

[54] LINEAR MOTION BEARING

[75] Inventor: Peter R. Mugglestone, Northport, N.Y.

[73] Assignee: Thomson Industries, Inc., Port Washington, N.Y.

[21] Appl. No.: 639,558

[22] Filed: Jan. 10, 1991

[51] Int. Cl.⁵ .............................................. F16C 29/06
[52] U.S. Cl. ........................................ 384/45; 384/43
[58] Field of Search .................................... 384/43–45

[56] References Cited

U.S. PATENT DOCUMENTS

| | | | |
|---|---|---|---|
| 4,420,193 | 12/1983 | Teramachi | 384/45 |
| 4,475,776 | 10/1984 | Teramachi . | |
| 4,632,573 | 12/1986 | Itoh | 384/43 |
| 4,637,739 | 1/1987 | Hattori | 384/45 |
| 4,662,763 | 5/1987 | Itoh | 384/45 |
| 4,674,893 | 6/1987 | Teramachi | 384/45 |
| 4,746,228 | 5/1988 | Shimo | 384/44 |
| 4,797,012 | 10/1989 | Tanaka | 384/45 |
| 4,869,600 | 9/1989 | Tonogai | 384/43 |
| 4,932,067 | 6/1990 | Pester et al. | 384/45 |
| 4,932,279 | 6/1990 | Kasuga | 384/45 |
| 4,974,971 | 12/1990 | Tanaka | 384/45 |
| 4,983,049 | 1/1991 | Lecomte | 384/45 |

*Primary Examiner*—Thomas R. Hannon
*Attorney, Agent, or Firm*—Dilworth & Barrese

[57] ABSTRACT

A linear motion bearing assembly is provided having a rail, a bearing carriage supported on the rail by rolling elements, the carriage having a pair of depending legs for movement along the rail and a pair of interlocking end cap/return track elements. The depending legs have load bearing grooves formed on an inner longitudinal surface and partial return tracks form on an outer longitudinal surface. The end cap/return track elements form a complimentary portion of the return track and have rolling element turnaround, formed therin to interconnect the load bearing and return tracks. The end cap/return track elements interlock to each other around the bearing carriage and are supported thereon by integral support structure. Sealing means are optionally provided for adverse operating conditions.

15 Claims, 5 Drawing Sheets

LINEAR MOTION BEARING

BACKGROUND OF THE INVENTION

1. Field of the Invention

The present invention relates to anti-friction linear motion bearings and, more particularly, to linear motion bearing assemblies containing a plurality of rolling elements in recirculating load and return tracks.

2. Description of the Prior Art

Linear motion bearing assemblies are well known in the art and are used extensively in a wide variety of machines, machine tools, transfer systems and other equipment where one part is to be moved longitudinally with respect to another. These assemblies may comprise an inverted substantially U-shaped bearing carriage mounted astride a modified Y-beam, I-beam or T-beam shaped rail. A plurality of pairs of load bearing and return tracks are provided in association with the carriage for a plurality of recirculating rolling elements, such as for example balls or rollers. These rolling elements travel alternately through load bearing tracks and return tracks to facilitate movement of the carriage along the rail with minimum friction.

End caps are usually located on both longitudinal ends of the carriage and may have turnarounds formed therein for transferring the recirculating rolling elements from load bearing tracks to return tracks. The turnarounds typically comprise a semi-toroidal shaped track connecting a load bearing track to a return track. At the center of the semi-toroid, an inner guide may be provided to smooth the movement of the rolling elements around the curved position from the load bearing track to the return track and to prevent the rolling elements from bunching up in the turns. These end caps are usually formed out of plastic material using molds which form the curved tracks of the turnaround integral with the end cap.

Bores or channels are typically cut or drilled into the carriage body to form the return tracks for the recirculating rolling elements. See, for example, U.S. Pat. No. 4,797,012. In some embodiments, the return tracks are formed by drilling or cutting bores or grooves conforming in size to the dimensions of the rolling elements directly into the bearing carriage within the depending legs of the U-shaped structure. See, for example, U.S. Pat. No. 4,932,067. This procedure is time consuming, requires special precision grinding and/or drilling instrumentation and greatly increases the expense involved in the manufacture and assembly of linear motion bearings. Also, where the rolling elements are of small diameter, extreme care must be taken to insure that the bores are accurate and properly aligned.

In order to avoid these drawbacks, other embodiments place the entire return track in separate structure which extends around the outside of the depending legs of the U-shaped structure. See, for example, U.S. Pat. Nos. 4,662,763 and 4,632,573. These embodiments, however, tend to decrease the rigidity of the bearing carriage or to expand the width of the carriage by the amount of space required for the outside return tracks.

Substantially all of the aforementioned embodiments require that a number of mounting holes be drilled into the carriage to insure proper alignment of the relatively large number of molded and machined parts to be assembled. All of these operations must be done with great precision in order to insure a dependable linear motion bearing assembly that can provide good service even under adverse operating conditions.

Other approaches have involved the reduction of both load bearing and return tracks into discrete elements including separate end caps, closure elements/intermediate members and/or side plates. See, for example, U.S. Pat. Nos. 4,869,600, 4,746,228, 4,674,893 and 4,637,739. These approaches necessarily require the intricate and accurate alignment and assembly of a number of separate elements as well as separate moldings for the individual elements.

Therefore, it would be highly desirable to have a dependable linear motion bearing assembly which avoids the need for extensive drilling and/or grinding of mounting holes and return tracks into the depending legs of the carriage and which is easily assembled utilizing a minimum number of molded parts without drilling mounting holes in the bearing carriage.

Accordingly, it is one object of the present invention to provide a linear motion bearing assembly wherein the return tracks are outside the depending legs of the carriage body.

It is a further object of the present invention to provide a linear motion bearing wherein the end caps and outer portions of the return tracks are integrally formed in an interfitting configuration thus eliminating the need for a large number of separate molded parts.

It is also an object of the present invention to provide a dependable linear motion bearing assembly which can be easily fabricated with a minimum number of molded parts without the need for mounting holes to be drilled into the carriage block.

These and other highly desirable objects are accomplished by the present invention in a linear motion bearing having return tracks outside the depending legs of the bearing carriage and wherein the end caps and portions of the return tracks are integrally formed in interfitting configuration to facilitate assembly to the bearing carriage without the need for mounting holes to be drilled therein.

Objects and advantages of the invention are set forth in part herein and in part will be obvious therefrom, or may be learned by practice with the invention, which is realized and attained by means of the instrumentalities and combinations pointed out in the appended claims. The invention consists of novel parts, constructions, arrangements, combinations, steps and improvements herein shown and described.

SUMMARY OF THE INVENTION

According to the present invention, there is provided a linear motion bearing assembly having return tracks substantially around the outside of the depending legs of the bearing carriage wherein the end caps and a portion of the return tracks are integrally formed in two interfitting elements and mounted on the bearing carriage without the need for mounting holes to be drilled therein. The combination end caps/return track elements are preferably identical images of each other permitting the use of a single mold for both elements.

Turnarounds are integrally formed in each end cap to interconnect the inner load bearing tracks and the outside return tracks. Where desired, an inner axis for the turnaround also may be formed with the end cap to aid in the transition of the rolling elements from load bearing tracks to return tracks.

Where the bearing assembly is to be used under adverse operating conditions, a seal may be added to the bearing carriage and interlocked with the end cap/return track elements.

This structure provides a dependable linear motion bearing assembly that is easy to fabricate with a minimum number of moldable parts and eliminates the need for excessive drilling and/or tapping of the bearing carriage.

BRIEF DESCRIPTION OF THE DRAWINGS

The accompanying drawings, referred to herein and constituting a part hereof, illustrate the preferred embodiments of the apparatus of the present invention, and, together with the description, serve to explain the principles of the invention.

DETAILED DESCRIPTION OF PREFERRED EMBODIMENTS

Figure 1:
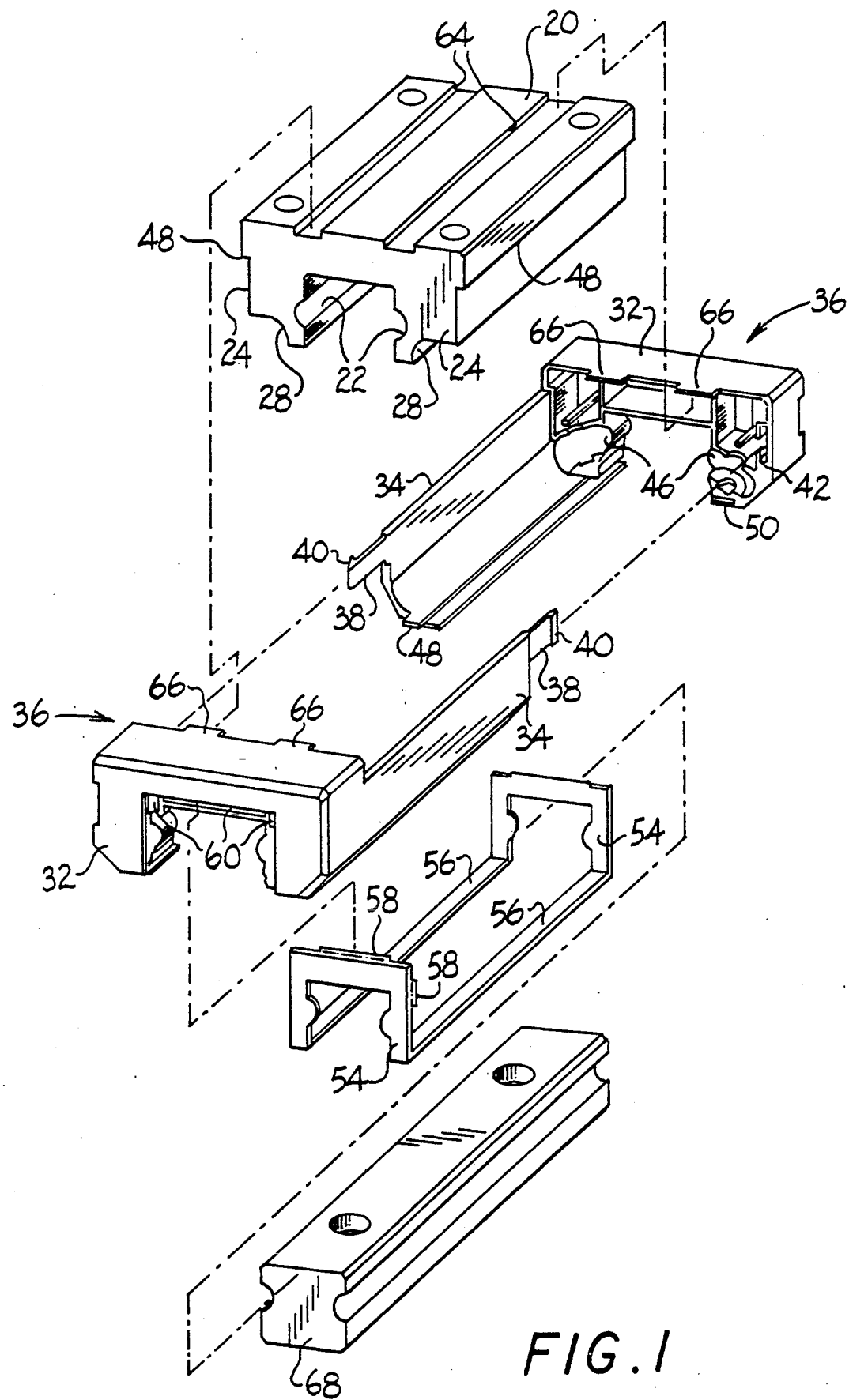
FIG. 1 is an expanded perspective view of the linear motion bearing assembly in accordance with a preferred embodiment of the present invention.
Figure 4:
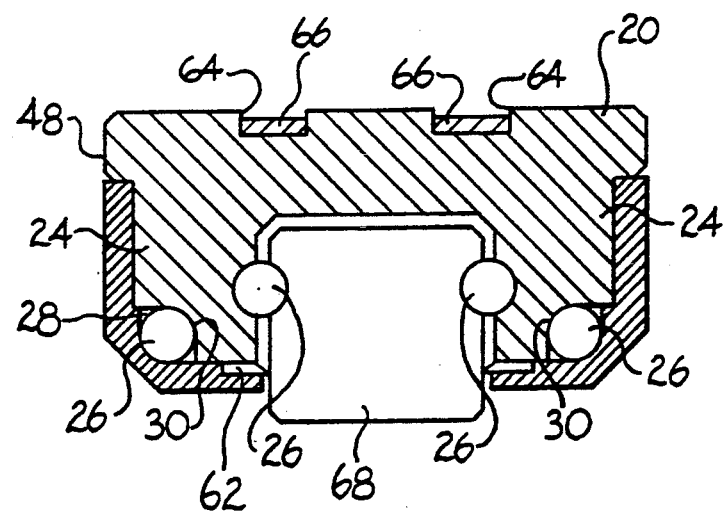
FIG. 4 is a longitudinal view in cross section of an assembled linear motion bearing mounted on a rail.

Referring now to the drawings in detail, and initially to FIG. 1, an inverted substantially U-shaped bearing carriage 20 is shown having an internal longitudinal groove 22 formed in each depending leg 24. These grooves serve as the load bearing paths for rolling elements 26 (best shown in FIG. 4). External grooves 28 are formed in each depending leg 24 proximate the bottom edge to a depth approximating the diameter of rolling elements 26. These grooves 28 serve as the internal surface of return paths for rolling elements 26. In the embodiment shown in FIG. 1, the external grooves 28 are formed in the lower outside corner of depending legs 24 to facilitate ease of manufacture and to avoid expanding the width of the bearing carriage 20 to compensate for the outside return path. This position also allows the groove 28 to be extruded as part of the bearing carriage 20 thus avoiding the need for elaborate machining operations. It is contemplated, however, that the external groove 28 could be formed solely in the outside surface of depending legs 24 at some location not proximate the base and those embodiments are within the scope of the present invention.

In the embodiment of the linear motion bearing assembly shown in FIGS. 1–2, the end caps 32 and an outer portion of the return tracks 34 are integrally formed together in mirror image such that a single mold may be used to form both left and right halves of the combination end caps and outer return track portions (hereinafter referred to as the end cap/return track elements 36). In a preferred embodiment, the entire longitudinal length of the outer portion of a return track 34 is formed integrally with the right side of the end cap 32. Attaching means, preferably in the form of integral locking means is provided to join the two end cap/return track elements 36 together. In the embodiment of FIG. 1, a projection 38 with detent 40 is formed at a longitudinal end of the return track portion 34 opposite end cap 32. A mating slot 42 is formed through a left wall of end cap 32 terminating in cutout 44 dimensioned to engage and hold a corresponding projection 38 and detent 40 when opposing end cap/return track elements 36 are aligned on the bearing carriage 20 and joined. Other known locking means are well known in the art including bolts, gluing, heat sealing, welding, etc. These other locking means are contemplated by the present invention.

End cap/return track elements 36 are each provided with turnaround structure 46 dimensioned to conduct the rolling elements 26 between load bearing paths and return paths. This turnaround structure 46 may be semi-toroidal in shape and interconnects the outside return path with the load bearing path. Inner guides (not shown) also may be provided to ease the transition of the rolling elements 26 between the respective paths.

Figure 2:
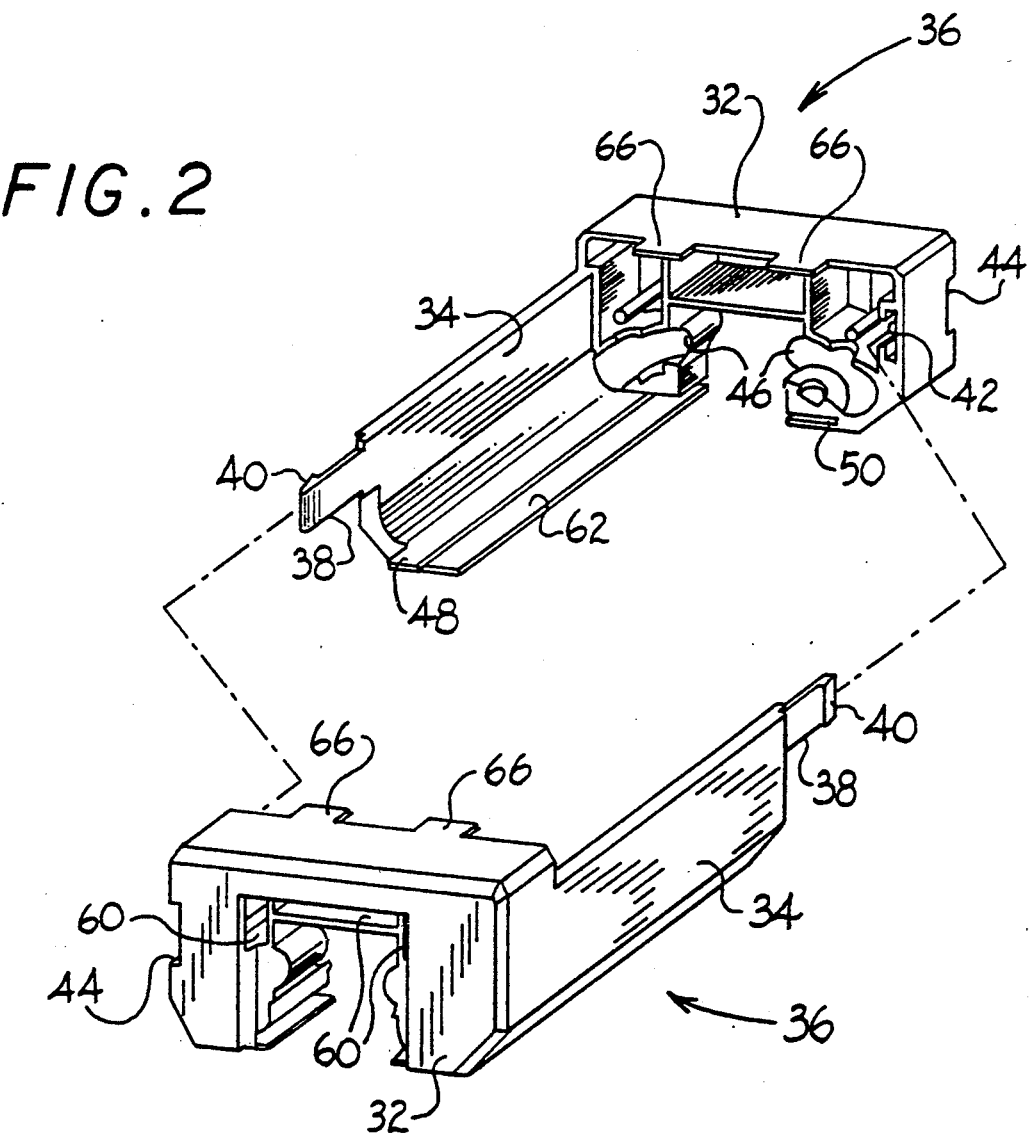
FIG. 2 is a perspective view of interlocking end cap/return track elements in accordance with the embodiment of FIG. 1.
Figure 3:
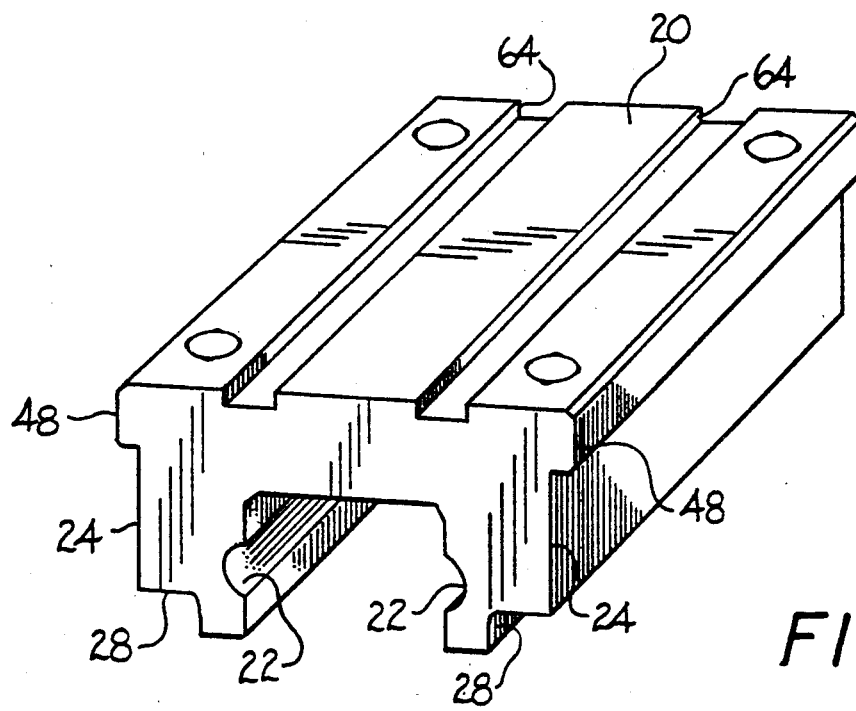
FIG. 3 is a perspective view of the bearing carriage of the embodiment shown in FIG. 1.

Outer return tracks 34 have a rounded L-shape as shown in FIGS. 1–2 and substantially conform to the sidewalls of the end caps 32. The uppermost portion of the L-shaped outer return track 34 is preferably dimensioned to fit flush with the overhang 48 in the bearing carriage 20. In this manner, a smooth uninterrupted sidewall is presented. The yoke of the L-shaped outer return track 34 is rounded to substantially conform to the dimensions of the rolling elements 26 designed to pass therethrough. This rounded portion in combination with external grooves 28 serve to form the complete return track. In order to provide accurate alignment and stability of the joined end cap/return track elements 36 a second projection 48 is provided in the horizontal portion of the L-shaped outer return track 34 proximate projection 38. This second projection 48 interfits with cavity 50 formed in end cap 32. Bearing carriage 20 is provided with longitudinal channels 64 which serve to align end cap/return track elements 36 on the carriage 20 by interfitting with projections 66 formed on the top surface of end cap/return track elements 36.

Figure 5:
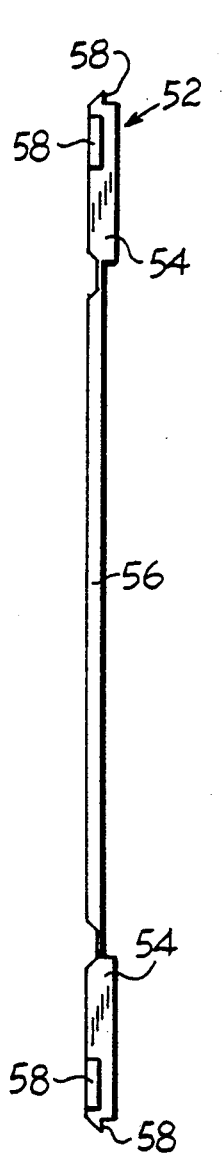
FIGS. 5–7 are views of a seal in accordance with the present invention.
Figure 6:
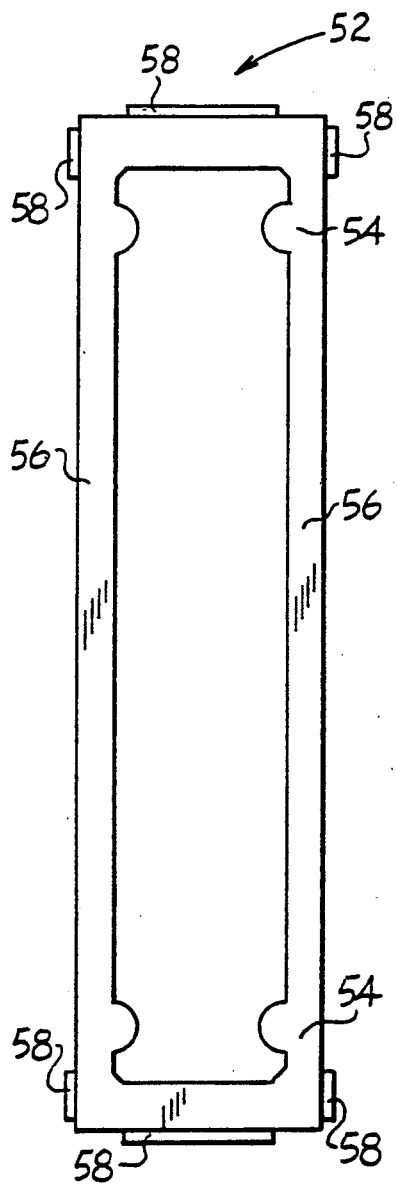
Figure 7:
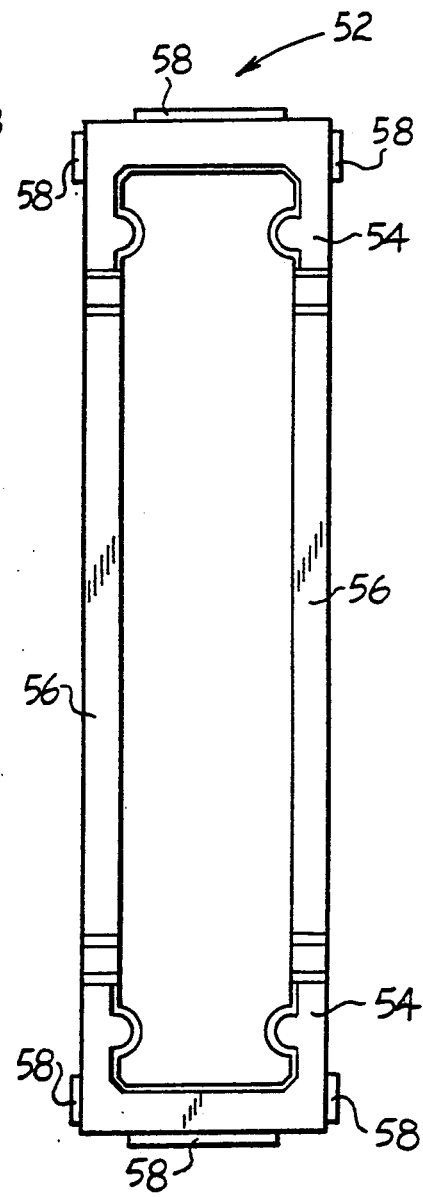
Figure 8:
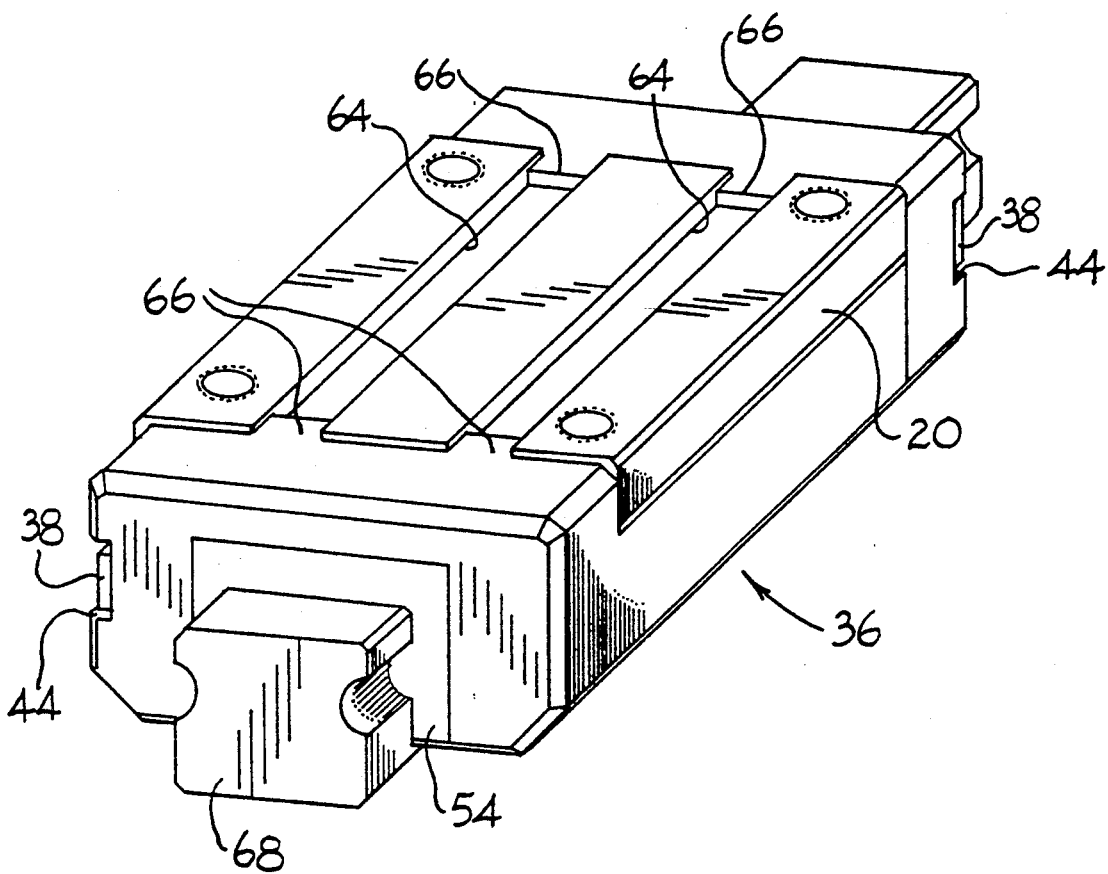
FIG. 8 is a perspective view of a complete linear motion bearing assembly in accordance with the present invention.

In a preferred embodiment, the end cap/return track elements 36 are molded from an engineering plastic, for example, polyacetals, polycarbonates, polyamides, etc. One skilled in the art, however, would realize that other materials and fabrication methods also would be appropriate.

Where the linear motion bearing assembly is to be subjected to an environment which could possibly contaminate the rolling elements in the load bearing or return tracks, a sealing means 52 can be added to the linear motion bearing assembly to shield access to the recirculating tracks. One embodiment of such sealing means 52 is shown in FIGS. 5–7 and comprises two end portions 54 interconnected by flexible, self adjusting longitudinal sections 56. In a preferred embodiment, the end portions 54 snap fit securely to the end caps 32 of the linear motion bearing and stretch longitudinal sections 56 to adjustably fit along the bottom of the bearing carriage 20. The snap fit attachment is accomplished by means of pressing projections 58 in end portions 54 into corresponding slots 60 in end caps 32. Other joining methods such as, for example, gluing, bolting, welding etc. are well known in the art and are contemplated by the present invention. These longitudinal sections serve to further protect the load bearing tracks from external contamination during operation of the linear motion bearing.

In a preferred embodiment, longitudinal sections 56 are retained within a channel 62 formed in the horizontal longitudinal edge of outer return track 34. The sealing means 52 can be fabricated from a wide variety of materials including plastics and rubber materials. The seal may incorporate metal stiffeners in the end portion 54 in order to give the seal further rigidity and sealing protection.

The linear motion bearing in accordance with this embodiment is assembled by approximating opposing end cap/return track elements 36 around bearing carriage 20 and aligning projections 38 with slots 42, projections 66 with channels 64 and projections 48 with cavity 50. Prior to final joining, the bearing carriage 20 is positioned on rail 68 and rolling elements 26 are loaded into the load bearing and return tracks. The opposing aligned end cap/return track elements 36 are locked together forming a completed linear motion bearing assembly. Where a sealing means is to be used, the seal 62 is positioned with the longitudinal sections 56 in longitudinal channels 64 and the end portions 54 proximate the end caps 32. The end portions 54 are then snap fitted into the end caps 32 as discussed above.

To the extend not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

I claim:

1. A linear motion bearing assembly comprising:
   a rail;
   a bearing carriage having a pair of depending legs, said bearing carriage adapted to move on said rail;
   p1 at least one longitudinal groove formed on an inner surface of each of said depending legs to define a portion of a rolling element load bearing track;
   at least one longitudinal groove formed on an outer surface of said depending legs to define a portion of a rolling element return track;
   a plurality of rolling elements disposed in the return and load bearing tracks;
   two end caps each monolithically formed with a return track element having integral rolling element turnarounds therein;
   said monolithically formed end cap and return track elements defining a complementary portion of said rolling element return track when in position on said bearing carriage, said monolithically formed end cap and return track elements having means for attachment to each other and means for independently supporting the end cap and return track elements on said bearing carriage.

2. A linear motion bearing assembly as in claim 1 further comprising sealing means.

3. A linear motion bearing assembly as in claim 2 wherein said sealing means snap fits into said end cap and return track elements.

4. A linear motion bearing assembly as in claim 1 wherein said end cap and return track elements are of the same configuration.

5. A linear motion bearing assembly as in claim 4 wherein each said end cap and return track element comprises an end cap with a complete longitudinal portion of a return track formed therewith.

6. A linear motion bearing assembly as in claim 1 wherein said means for attachment includes integral locking means comprising at least one projection on one said end cap and return track elements which interlocks with at least one slot on another of said end cap/return track elements.

7. A linear motion bearing assembly as in claim 1 wherein said means for independently supporting comprises at least one projection on said end cap/return track elements which interfits with a corresponding channel on said bearing carriage.

8. A linear motion bearing assembly as in claim 1 wherein said end cap and return track elements are molded from an engineering plastic.

9. A linear motion bearing assembly as in claim 8 wherein said engineering plastic is selected from the group consisting of polyacetals, polycarbonates and polyamides.

10. A linear motion bearing assembly comprising;
    a rail having a plurality of longitudinal grooves thereon;
    a substantially inverted U-shaped bearing carriage having a plurality of depending legs for longitudinal movement along the rail;
    at least one longitudinal load bearing groove formed on an inner longitudinal surface of each of the depending legs in alignment with the longitudinal grooves on the rail to define a load bearing track;
    at least one longitudinal semi arcuate surface formed on an outer longitudinal surface of each of the depending legs to define an inner portion of a rolling element return track;
    a plurality of rolling elements disposed in the load bearing and return tracks to support said bearing carriage on said rail; and
    two end caps each monolithically formed with a return track element defining an outer portion of the rolling element return tracks and including integral rolling element turnarounds interconnecting the load bearing and return tracks, said monolithically formed end cap and return track elements further having integral means for interconnecting said end cap and return track elements to each other and monolithically formed means for independently supporting said end cap and return track elements in position on said bearing carriage, said means for supporting said end cap and return track elements formed on an upper surface thereof.

11. A linear motion bearing assembly as in claim 10 further comprising sealing means removably attached to said end cap/return track elements.

12. A linear motion bearing assembly as in claim 10 wherein said means for supporting said end cap and return track elements comprises at least one monolithically formed projection on said end cap and return track elements, which projection interfits in a corresponding longitudinal channel formed in said bearing carriage.

13. A linear motion bearing assembly as in claim 10 wherein each said monolithically formed end cap and return track element comprises an end cap with a complete longitudinal portion of a return track monolithically formed therewith.

14. A linear motion bearing assembly as in claim 10 further comprising sealing means.

15. A linear motion bearing assembly comprising:

a rail having a plurality of longitudinal grooves thereon;

a bearing carriage having a plurality of depending legs for longitudinal movement along the rail, at least one longitudinal load bearing groove formed on an inner longitudinal surface of each of the depending legs in alignment with the longitudinal grooves on the rail to define a load bearing track;

at least one longitudinal groove formed on an outer longitudinal surface of each of the depending legs to define an inner portion of a rolling element return track;

a plurality of rolling elements disposed in the load bearing and return tracks to support said bearing carriage on said rail; and a pair of complementary end cap elements each monolithically formed with at least a portion of a return track thereon and integral rolling element turnarounds therein, said complementary end cap elements further having formed thereon means for attachment to each other and means for independently supporting said end cap elements in position on said bearing carriage when said end cap elements are connected together on said bearing carriage.

* * * * *

UNITED STATES PATENT AND TRADEMARK OFFICE
CERTIFICATE OF CORRECTION

PATENT NO. : 5,102,235
DATED : April 7, 1992
INVENTOR(S) : Mugglestone

It is certified that error appears in the above-indentified patent and that said Letters Patent is hereby corrected as shown below:

Column 5, line 39, delete "p1".

Signed and Sealed this

Ninth Day of November, 1993

Attest:

BRUCE LEHMAN

Attesting Officer     Commissioner of Patents and Trademarks